US012258543B2

(12) United States Patent
Lant et al.

(10) Patent No.: US 12,258,543 B2
(45) Date of Patent: Mar. 25, 2025

(54) CLEANING COMPOSITION COMPRISING BACTERIAL SPORES

(71) Applicant: The Procter & Gamble Company, Cincinnati, OH (US)

(72) Inventors: Neil Joseph Lant, Newcastle (GB); Katherine Esther Latimer, Newcastle (GB)

(73) Assignee: The Procter & Gamble Company, Cincinnati, OH (US)

( * ) Notice: Subject to any disclaimer, the term of this patent is extended or adjusted under 35 U.S.C. 154(b) by 107 days.

(21) Appl. No.: 17/829,405

(22) Filed: Jun. 1, 2022

(65) Prior Publication Data

US 2023/0039859 A1 Feb. 9, 2023

(30) Foreign Application Priority Data

Jul. 19, 2021 (EP) .................................... 21186295

(51) Int. Cl.

| | |
|---|---|
| ***C11D 1/00*** | (2006.01) |
| ***C11D 3/08*** | (2006.01) |
| ***C11D 3/10*** | (2006.01) |
| ***C11D 3/38*** | (2006.01) |
| ***C11D 3/39*** | (2006.01) |
| ***C11D 3/395*** | (2006.01) |
| ***C11D 3/48*** | (2006.01) |

(52) U.S. Cl.

CPC .............. *C11D 3/3905* (2013.01); *C11D 1/00* (2013.01); *C11D 3/08* (2013.01); *C11D 3/10* (2013.01); *C11D 3/381* (2013.01); *C11D 3/3902* (2013.01); *C11D 3/3917* (2013.01); *C11D 3/48* (2013.01)

(58) Field of Classification Search

CPC .... C11D 1/11; C11D 3/08; C11D 3/10; C11D 3/3902; C11D 3/3905; C11D 3/3917; C11D 3/48; C11D 3/381

USPC ....... 510/309, 313, 320, 351, 352, 376, 392, 510/509, 501

See application file for complete search history.

(56) References Cited

U.S. PATENT DOCUMENTS

| | | | | |
|---|---|---|---|---|
| 2009/0105109 | A1 | 4/2009 | Lant et al. | |
| 2016/0289605 | A1* | 10/2016 | Dotzauer | C11D 3/394 |
| 2016/0289606 | A1* | 10/2016 | Dotzauer | A61L 2/18 |
| 2017/0175056 | A1* | 6/2017 | Watson | C11D 3/3917 |
| 2019/0382692 | A1* | 12/2019 | Otting | C11D 3/3917 |
| 2021/0130737 | A1 | 5/2021 | Njoroge et al. | |

FOREIGN PATENT DOCUMENTS

| | | | | |
|---|---|---|---|---|
| EP | 2759590 | A1 | 7/2014 | |
| EP | 3085761 | A1 * | 10/2016 | C11D 1/83 |
| EP | 3301146 | A1 * | 4/2018 | |
| EP | 3546560 | A1 * | 10/2019 | C11D 3/0047 |
| WO | 2017117089 | A1 | 7/2017 | |
| WO | 2017157771 | A1 | 9/2017 | |
| WO | WO-2019226351 | A1 * | 11/2019 | C11D 1/72 |
| WO | WO-2020064467 | A1 * | 4/2020 | B01J 13/14 |
| WO | WO-2020114965 | A1 * | 6/2020 | C11D 11/0017 |

OTHER PUBLICATIONS

PCT Search Report and Written Opinion for PCT/US2022/072663 dated Sep. 26, 2022, 13 pages.

Extended European Search Report and Search Opinion: Application No 21186295.8; dated Dec. 17, 2021; 5 pages.

* cited by examiner

*Primary Examiner* — Gregory R Delcotto
(74) *Attorney, Agent, or Firm* — George H. Leal

(57) ABSTRACT

A cleaning composition including from about 5% to about 25% by weight of the composition of a hydrogen peroxide source; from 1% to about 10% by weight of the composition of a bleach activator; from about $1\times10^2$ to about $1\times10^{11}$ CFU/g of bacterial spores; and wherein the composition has a pH of from 9.5 to 11.5 as measured in 1% weight/volume aqueous solution in distilled water at 20° C.

11 Claims, No Drawings

CLEANING COMPOSITION COMPRISING BACTERIAL SPORES

FIELD OF THE INVENTION

The present application relates to a cleaning composition comprising a bleaching system and bacterial spores. There is also provided a method of using the composition to provide good removal of bleachable stains and sustained anti-malodor benefits.

BACKGROUND OF THE INVENTION

The use of bleach in cleaning products is known. Bleach possesses a broad spectrum of biological activity including bactericidal, fungicidal, biocidal and sporicidal activity over a wide temperature range and even at low temperatures. WO2017/15771A1 discloses methods for degrading malodors using bacterial spores. The objective of the present invention is to find compositions and methods that provide good removal of bleachable stains and at the same time long-lasting malodor reduction and/or prevention.

SUMMARY OF THE INVENTION

According to one aspect of the invention, there is provided a cleaning composition. The composition comprises a bleaching system and bacterial spores. The composition has a pH of from about 9.5 to about 11.5 as measured in 1% weight/volume aqueous solution in distilled water at 20° C. It has been surprisingly found that in the composition of the invention, spore stability is not affected by the bleaching system.

According to a second aspect of the invention, there is provided a method of treating a surface, the method comprises the treatment step of treating the surface with the composition of the invention to provide long lasting malodor prevention and/or malodor removal. Preferably, the method involves the treatment of fabrics in a laundry process.

The elements of the composition of the invention described in relation to the first aspect of the invention apply mutatis mutandis to the second aspect of the invention.

DETAILED DESCRIPTION OF THE INVENTION

The present invention encompasses a cleaning composition and a method of treating a surface using the composition of the invention. The surface can be a hard or a soft surface, preferably the surface is a fabric.

The composition and method of the invention provide bleachable stain removal and malodor removal and it also provides malodor prevention during a sustained period of time, especially during use of the surface after the surface has been treated.

It has been unexpectedly found that the composition and method of the invention provide a synergy in terms of removal of bleachable stains and malodor removal and/or malodor prevention over a sustained period of time. In the case of fabrics, for example, when the fabrics are subjected to the right moisture and nutrients conditions, the spores germinate, activating the bacteria that in turn excretes enzymes that help to break down soils preventing and/or reducing malodor.

The present invention also encompasses a method of treating fabrics to provide sustained malodor prevention and/or malodor removal. By "sustained" is meant that the malodor prevention and/or removal takes place for at least 24 hours, preferably for at least 48 hours after the surface, preferably a fabric, has been treated. Without being bound by theory it is believed that the bacterial spores germinate with external stimulus such as moisture, heat and sweat from the user, thereby contributing to malodor removal and/or malodor prevention during the wearing of the fabrics.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

The composition of the invention comprises:

i) from about 5% to about 25%, preferably from about 8% to about 18%, more preferably from about 10 to 15% by weight of the composition of a hydrogen peroxide source, preferably the source of hydrogen peroxide comprises percarbonate;

ii) from 1.0% to about 10%, preferably from 1.5% to about 9% and more preferably from 2.0 to 8% by weight of the composition of bleach activator, preferably the bleach activator comprises TAED;

iii) from about $1\times10^{2}$ to about $1\times10^{11}$ CFU/g of bacterial spores, from about $1\times10^{2}$ to about $1\times10^{9}$ CFU/g, preferably from about $1\times10^{3}$ to about $1\times10^{7}$, more preferably from about $1\times10^{4}$ to about $1\times10^{7}$ CFU/g, preferably the bacterial spores comprise bacteria from the genus *Bacillus*.

The composition of the invention has a pH of from about 9.5 to about 11.5, preferably from about 10.0 to about 11.0, as measured in 1% weight/volume aqueous solution in distilled water at 20° C.

The composition of the invention preferably has a reserve alkalinity to pH of 7.5 between about 5 to about 20 (expressed as g NaOH/100 g composition), determined by titrating a 1% (w/v) solution of composition with 0.2 M hydrochloric acid in distilled water at 20° C. Reserve alkalinity can be measured as follows:

Obtain a 10 g sample accurately weighed to two decimal places, of fully formulated detergent composition. The sample should be obtained using a Pascall sampler in a dust cabinet. Add the 10 g sample to a plastic beaker and add 200 ml of carbon dioxide-free deionised water. Agitate using a magnetic stirrer on a stirring plate at 150 rpm until fully dissolved and for at least 15 minutes. Transfer the contents of the beaker to a 1 litre volumetric flask and make up to 1 litre with deionised water. Mix well and take a 100 mls±1 ml aliquot using a 100 mls pipette immediately. Measure and record the pH and temperature of the sample using a pH meter capable of reading to ±0.01 pH units, with stirring, ensuring temperature is 21° C.+/−2° C. Titrate whilst stirring with 0.2 M hydrochloric acid until pH measures exactly 7.5. Note the milliliters of hydrochloric acid used. Take the average titre of three identical repeats. Carry out the calculation below to calculate Reserve Alkalinity to pH 7.5:

Reserve alkalinity (in g NaOH/100 g)=(T×M×40×Vol)/(10×Wt×Aliquot)

Wherein:

T=titre (ml) to pH 7.5

M=Molarity of HCl=0.2

40=Molecular weight of NaOH

Vol=Total volume (ie. 1000 ml)

W=Weight of product (10 g)

Aliquot=(100 ml)

Preferably the composition of the invention is a laundry detergent composition, preferably the composition comprises a detergent ingredient selected from: detersive surfactant, such as anionic detersive surfactants, non-ionic detersive surfactants, cationic detersive surfactants, zwitterionic detersive surfactants and amphoteric detersive surfactants; polymers, such as carboxylate polymers, soil release polymer, anti-redeposition polymers, cellulosic polymers and care polymers; enzymes, such as proteases, amylases, cellulases, lipases; zeolite builder; phosphate builder; co-builders, such as citric acid and citrate; carbonate, such as sodium carbonate and sodium bicarbonate; sulphate salt, such as sodium sulphate; silicate salt such as sodium silicate; chloride salt, such as sodium chloride; brighteners; chelants; hueing agents; dye transfer inhibitors; dye fixative agents; perfume; silicone; fabric softening agents, such as clay; flocculants, such as polyethyleneoxide; suds supressors; and any combination thereof.

Bacterial Spores

The bacterial spores for use herein: i) are capable of surviving the conditions found in a laundry treatment; ii) are fabric substantive; iii) have the ability to control odor; and iv) preferably have the ability to support the cleaning action of laundry detergents. The spores have the ability to germinate and to form cells on the fabrics using malodor precursors as nutrients. The spores can be delivered in liquid or solid form. Preferably, the spores are in solid form. Especially preferred compositions herein are compositions in powder form comprising spores in solid form.

Some gram-positive bacteria have a two-stage lifecycle in which growing bacteria under certain conditions such as in response to nutritional deprivation can undergo an elaborate developmental program leading to spores or endospores formation. The bacterial spores are protected by a coat consisting of about 60 different proteins assembled as a biochemically complex structure with intriguing morphological and mechanical properties. The protein coat is considered a static structure that provides rigidity and mainly acting as a sieve to exclude exogenous large toxic molecules, such as lytic enzymes. Spores play critical roles in long term survival of the species because they are highly resistant to extreme environmental conditions. Spores are also capable of remaining metabolically dormant for years. Methods for obtaining bacterial spores from vegetative cells are well known in the field. In some examples, vegetative bacterial cells are grown in liquid medium. Beginning in the late logarithmic growth phase or early stationary growth phase, the bacteria may begin to sporulate. When the bacteria have finished sporulating, the spores may be obtained from the medium, by using centrifugation for example. Various methods may be used to kill or remove any remaining vegetative cells. Various methods may be used to purify the spores from cellular debris and/or other materials or substances. Bacterial spores may be differentiated from vegetative cells using a variety of techniques, like phase-contrast microscopy, automated scanning microscopy, high resolution atomic force microscopy or tolerance to heat, for example. Because bacterial spores are generally environmentally-tolerant structures that are metabolically inert or dormant, they are readily chosen to be used in commercial microbial products. Despite their ruggedness and extreme longevity, spores can rapidly respond to the presence of small specific molecules known as germinants that signal favorable conditions for breaking dormancy through germination, an initial step in the process of completing the lifecycle by returning to vegetative bacteria. For example, the commercial microbial products may be designed to be dispersed into an environment where the spores encounter the germinants present in the environment to germinate into vegetative cells and perform an intended function. A variety of different bacteria may form spores. Bacteria from any of these groups may be used in the compositions, methods, and kits disclosed herein. For example, some bacteria of the following genera may form spores: *Acetonema, Alkalibacillus, Ammomphilus, Amphibacillus, Anaerobacter, Anaerospora, Aneurinibacillus, Anoxybacillus, Bacillus, Brevibacillus, Caldanaerobacter, Caloramator, Caminicella, Cerasibacillus, Clostridium, Clostridiisalibacter, Cohnella, Dendrosporobacter, Desulfotomaculum, Desulfosporomusa, Desulfosporosinus, Desulfovirgula, Desulfunispora, Desulfurispora, Filifactor, Filobacillus, Gelria, Geobacillus, Geosporobacter, Gracilibacillus, Halonatronum, Heliobacterium, Heliophilum, Laceyella, Lentibacillus, Lysinibacillus, Mahella, Metabacterium, Moorella, Natroniella, Oceanobacillus, Orenia, Ornithinibacillus, Oxalophagus, Oxobacter, Paenibacillus, Paraliobacillus, Pelospora, Pelotomaculum, Piscibacillus, Planifilum, Pontibacillus, Propionispora, Salinibacillus, Salsuginibacillus, Seinonella, Shimazuella, Sporacetigenium, Sporoanaerobacter, Sporobacter, Sporobacterium, Sporohalobacter, Sporolactobacillus, Sporomusa, Sporosarcina, Sporotalea, Sporotomaculum, Syntrophomonas, Syntrophospora, Tenuibacillus, Tepidibacter, Terribacillus, Thalassobacillus, Thermoacetogenium, Thermoactinomyces, Thermoalkalibacillus, Thermoanaerobacter, Thermoanaeromonas, Thermobacillus, Thermoflavimicrobium, Thermovenabulum, Tuberibacillus, Virgibacillus*, and/or *Vulcanobacillus*.

Preferably, the bacteria that may form spores are from the family Bacillaceae, such as species of the genera *Aeribacillus, Aliibacillus, Alkalibacillus, Alkalicoccus, Alkalihalobacillus, Alkalilactibacillus, Allobacillus, Alteribacillus, Alteribacter, Amphibacillus, Anaerobacillus, Anoxybacillus, Aquibacillus, Aquisalibacillus, Aureibacillus, Bacillus, Caldalkalibacillus, Caldibacillus, Calditerricola, Calidifontibacillus, Camelliibacillus, Cerasibacillus, Compostibacillus, Cytobacillus, Desertibacillus, Domibacillus, Ectobacillus, Evansella, Falsibacillus, Ferdinandcohnia, Fermentibacillus, Fictibacillus, Filobacillus, Geobacillus, Geomicrobium, Gottfriedia, Gracilibacillus, Halalkalibacillus, Halobacillus, Halolactibacillus, Heyndrickxia, Hydrogenibacillus, Lederbergia, Lentibacillus, Litchfieldia, Lottiidibacillus, Margalitia, Marinococcus, Melghiribacillus, Mesobacillus, Metabacillus, Microaerobacter, Natribacillus, Natronobacillus, Neobacillus, Niallia, Oceanobacillus, Ornithinibacillus, Parageobacillus, Paraliobacillus, Paralkalibacillus, Paucisalibacillus, Pelagirhabdus, Peribacillus, Piscibacillus, Polygonibacillus, Pontibacillus, Pradoshia, Priestia, Pseudo gracilibacillus, Pueribacillus, Radiobacillus, Robertmurraya, Rossellomorea, Saccharococcus, Salibacterium, Salimicrobium, Salinibacillus, Salipaludibacillus, Salirhabdus, Salisediminibacterium, Saliterribacillus,*

*Salsuginibacillus, Sediminibacillus, Siminovitchia, Sinibacillus, Sinobaca, Streptohalobacillus, Sutcliffiella, Swionibacillus, Tenuibacillus, Tepidibacillus, Terribacillus, Terrilactibacillus, Texcoconibacillus, Thalassobacillus, Thalassorhabdus, Thermolongibacillus, Virgibacillus, Viridibacillu, Vulcanibacillus, Weizmannia*. In various examples, the bacteria may be strains of *Bacillus Bacillus acidicola, Bacillus aeolius, Bacillus aerius, Bacillus aerophilus, Bacillus albus, Bacillus altitudinis, Bacillus alveayuensis, Bacillus amyloliquefaciensex, Bacillus anthracis, Bacillus aquiflavi, Bacillus atrophaeus, Bacillus australimaris, Bacillus badius, Bacillus benzoevorans, Bacillus cabrialesii, Bacillus canaveralius, Bacillus capparidis, Bacillus carboniphilus, Bacillus cereus, Bacillus chungangensis, Bacillus coahuilensis, Bacillus cytotoxicus, Bacillus decisifrondis, Bacillus ectoiniformans, Bacillus enclensis, Bacillus fengqiuensis, Bacillus fungorum, Bacillus glycinifermentans, Bacillus gobiensis, Bacillus halotolerans, Bacillus haynesii, Bacillus horti, Bacillus inaquosorum, Bacillus infantis, Bacillus infernus, Bacillus isabeliae, Bacillus kexueae, Bacillus licheniformis, Bacillus luti, Bacillus manusensis, Bacillus marinisedimentorum, Bacillus mesophilus, Bacillus methanolicus, Bacillus mobilis, Bacillus mojavensis, Bacillus mycoides, Bacillus nakamurai, Bacillus ndiopicus, Bacillus nitratireducens, Bacillus oleivorans, Bacillus pacificus, Bacillus pakistanensis, Bacillus paralicheniformis, Bacillus paramycoides, Bacillus paranthracis, Bacillus pervagus, Bacillus piscicola, Bacillus proteolyticus, Bacillus pseudomycoides, Bacillus pumilus, Bacillus safensis, Bacillus salacetis, Bacillus salinus, Bacillus salitolerans, Bacillus seohaeanensis, Bacillus shivajii, Bacillus siamensis, Bacillus smithii, Bacillus solimangrovi, Bacillus songklensis, Bacillus sonorensis, Bacillus spizizenii, Bacillus spongiae, Bacillus stercoris, Bacillus stratosphericus, Bacillus subtilis, Bacillus swezeyi, Bacillus taeanensis, Bacillus tamaricis, Bacillus tequilensis, Bacillus thermocloacae, Bacillus thermotolerans, Bacillus thuringiensis, Bacillus tianshenii, Bacillus toyonensis, Bacillus tropicus, Bacillus vallismortis, Bacillus velezensis, Bacillus wiedmannii, Bacillus wudalianchiensis, Bacillus xiamenensis, Bacillus xiapuensis, Bacillus zhangzhouensis*, or combinations thereof.

In some examples, the bacterial strains that form spores may be strains of *Bacillus*, including: *Bacillus* sp. strain SD-6991; *Bacillus* sp. strain SD-6992; *Bacillus* sp. strain NRRL B-50606; *Bacillus* sp. strain NRRL B-50887; *Bacillus pumilus* strain NRRL B-50016; *Bacillus amyloliquefaciens* strain NRRL B-50017; *Bacillus amyloliquefaciens* strain PTA-7792 (previously classified as *Bacillus atrophaeus*); *Bacillus amyloliquefaciens* strain PTA-7543 (previously classified as *Bacillus atrophaeus*); *Bacillus amyloliquefaciens* strain NRRL B-50018; *Bacillus amyloliquefaciens* strain PTA-7541; *Bacillus amyloliquefaciens* strain PTA-7544; *Bacillus amyloliquefaciens* strain PTA-7545; *Bacillus amyloliquefaciens* strain PTA-7546; *Bacillus subtilis* strain PTA-7547; *Bacillus amyloliquefaciens* strain PTA-7549; *Bacillus amyloliquefaciens* strain PTA-7793; *Bacillus amyloliquefaciens* strain PTA-7790; *Bacillus amyloliquefaciens* strain PTA-7791; *Bacillus subtilis* strain NRRL B-50136 (also known as DA-33R, ATCC accession No. 55406); *Bacillus amyloliquefaciens* strain NRRL B-50141; *Bacillus amyloliquefaciens* strain NRRL B-50399; *Bacillus licheniformis* strain NRRL B-50014; *Bacillus licheniformis* strain NRRL B-50015; *Bacillus amyloliquefaciens* strain NRRL B-50607; *Bacillus subtilis* strain NRRL B-50147 (also known as 300R); *Bacillus amyloliquefaciens* strain NRRL B-50150; *Bacillus amyloliquefaciens* strain NRRL B-50154; *Bacillus megaterium* PTA-3142; *Bacillus amyloliquefaciens* strain ATCC accession No. 55405 (also known as 300); *Bacillus amyloliquefaciens* strain ATCC accession No. 55407 (also known as PMX); *Bacillus pumilus* NRRL B-50398 (also known as ATCC 700385, PMX-1, and NRRL B-50255); *Bacillus cereus* ATCC accession No. 700386; *Bacillus thuringiensis* ATCC accession No. 700387 (all of the above strains are available from Novozymes, Inc., USA); *Bacillus amyloliquefaciens* FZB24 (e.g., isolates NRRL B-50304 and NRRL B-50349 TAEGRO® from Novozymes), *Bacillus pumilus* (e.g., isolate NRRL B-50349 from Bayer CropScience), *Bacillus amyloliquefaciens* TrigoCor (also known as "TrigoCor 1448"; e.g., isolate Embrapa Trigo Accession No. 144/88.4Lev, Cornell Accession No. Pma007BR-97, and ATCC accession No. 202152, from Cornell University, USA) and combinations thereof.

In some examples, the bacterial strains that form spores may be strains of *Bacillus amyloliquefaciens*. For example, the strains may be *Bacillus amyloliquefaciens* strain PTA-7543 (previously classified as *Bacillus atrophaeus*), and/or *Bacillus amyloliquefaciens* strain NRRL B-50154, *Bacillus amyloliquefaciens* strain PTA-7543 (previously classified as *Bacillus atrophaeus*), *Bacillus amyloliquefaciens* strain NRRL B-50154, or from other *Bacillus amyloliquefaciens* organisms.

In some examples, the bacterial strains that form spores may be *Brevibacillus* spp., e.g., *Brevibacillus brevis; Brevibacillus formosus; Brevibacillus laterosporus*; or *Brevibacillus parabrevis*, or combinations thereof.

In some examples, the bacterial strains that form spores may be *Paenibacillus* spp., e.g., *Paenibacillus alvei; Paenibacillus amylolyticus; Paenibacillus azotofixans; Paenibacillus cookii; Paenibacillus macerans; Paenibacillus polymyxa; Paenibacillus validus*, or combinations thereof. The bacterial spores may have an average particle diameter of about 2-50 microns, suitably about 10-45 microns. *Bacillus* spores are commercially available in blends in aqueous carriers and are insoluble in the aqueous carriers. Other commercially available *bacillus* spore blends include without limitation Freshen Free™ CAN (10×), available from Novozymes Biologicals, Inc.; Evogen® Renew Plus (10×), available from Genesis Biosciences, Inc.; and Evogen® GT (10×, 20× and 110×), all available from Genesis Biosciences, Inc. In the foregoing list, the parenthetical notations (10×, 20×, and 110×) indicate relative concentrations of the *Bacillus* spores.

Bacterial spores used in the composition and method of the invention may or may not be heat activated. In some examples, the bacterial spores are heat activated. In some examples, the bacterial spores are not heat inactivated. Preferably, the spores used herein are heat activated. Heat activation may comprise heating bacterial spores from room temperature (15-25° C.) to optimal temperature of between 25-120° C., preferably between 40 C-100° C., and held the optimal temperature for not more than 2 hours, preferably between 70-80° C. for 30 min.

For the composition and method disclosed herein, populations of bacterial spores are generally used. In some examples, a population of bacterial spores may include bacterial spores from a single strain of bacterium. Preferably, a population of bacterial spores may include bacterial spores from 2, 3, 4, 5, or more strains of bacteria. Generally, a population of bacterial spores contains a majority of spores and a minority of vegetative cells. In some examples, a population of bacterial spores does not contain vegetative cells. In some examples, a population of bacterial spores may contain less than about 1%, 2%, 3%, 4%, 5%, 6%, 7%, 8%, 9%, 10%, 15%, 20%, 25%, 30%, 40%, or 50% vegetative cells, where the percentage of bacterial spores is calculated as ((vegetative cells/(spores in population+vegetative cells in population))×100). Generally, populations of bacterial spores used in the disclosed methods, compositions and products are stable (i.e. not undergoing germination), with at least some individual spores in the population capable of germinating.

Populations of bacterial spores used in this disclosure may contain bacterial spores at different concentrations. In various examples, populations of bacterial spores may contain, without limitation, at least $1\times10^2$, $5\times10^2$, $1\times10^3$, $5\times10^3$, $1\times10^4$ $5\times10^4$, $1\times10^5$, $5\times10^5$, $1\times10^6$, $5\times10^6$, $1\times10^7$, $5\times10^7$, $1\times10^8$, $5\times10^8$, $1\times10^9$, $5\times10^9$, $1\times10^{10}$, $5\times10^{10}$, $1\times10^{11}$, $5\times10^{11}$, $1\times10^{12}$, $5\times10^{12}$, $1\times10^{13}$, $5\times10^{13}$, $1\times10^{14}$, or $5\times10^{14}$ spores/ml, spores/gram, or spores/$cm^3$.

Preferably, the bacterial spores comprise *Bacillus* spores, more preferably *Bacillus* selected from the group consisting of *Bacillus subtilis, Bacillus amyloliquefaciens, Bacillus licheniformis, Bacillus megaterium, Bacillus pumilus, Bacillus cereus, Bacillus thuringiensis, Bacillus mycoides, Bacillus tequilensis, Bacillus vallismortis, Bacillus mojavensis* and mixtures thereof, more preferably selected from the group consisting of *Bacillus subtilis, Bacillus amyloliquefaciens, Bacillus licheniformis, Bacillus megaterium, Bacillus pumilus* and mixtures thereof.

Hydrogen Peroxide Source

The composition of the invention comprises from about 5% to about 25%, preferably from about 8% to about 22%, more preferably from about 10 to 20% by weight of the composition of a hydrogen peroxide source.

Hydrogen peroxide sources suitable for use herein include solid materials which liberate hydrogen peroxide on dissolution, such as sodium perborate, sodium percarbonate, hydrogen peroxide-urea adduct, complexes of hydrogen peroxide with polyvinyl pyrrolidone or crosslinked polyvinyl pyrrolidone such as those sold under the Peroxydone® brand by Ashland.

The inorganic perhydrate salts are normally the alkali metal salts. The inorganic perhydrate salt may be included as the crystalline solid without additional protection. Alternatively, the salt can be coated. Suitable coatings include sodium sulphate, sodium carbonate, sodium silicate and mixtures thereof. Said coatings can be applied as a mixture applied to the surface or sequentially in layers.

Alkali metal percarbonates, particularly sodium percarbonate is the preferred bleach for use herein. The percarbonate is most preferably incorporated into the products in a coated form which provides in-product stability.

Bleach Activator

The composition of the invention comprises from 1.0% to about 10%, preferably from 1.5% to about 9%, more preferably from about 2.0 to 8% by weight of the composition of a bleach activator. A preferred bleach activator for the composition of the invention is tetraacetylethylenediamine.

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 12 carbon atoms, in particular from 2 to 10 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), decanoyloxybenzoic acid (DOBA), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). TAED is the preferred bleach activator to use herein.

Detersive Surfactant: Suitable detersive surfactants include anionic detersive surfactants, non-ionic detersive surfactant, cationic detersive surfactants, zwitterionic detersive surfactants and amphoteric detersive surfactants. Suitable detersive surfactants may be linear or branched, substituted or un-substituted, and may be derived from petrochemical material or biomaterial.

Anionic detersive surfactant: Suitable anionic detersive surfactants include sulphonate and sulphate detersive surfactants. Preferably, the composition of the invention comprises from about 1% to about 30% by weight of the composition of anionic surfactant.

Suitable sulphonate detersive surfactants include methyl ester sulphonates, alpha olefin sulphonates, alkyl benzene sulphonates, especially alkyl benzene sulphonates, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, other suitable LAB include high 2-phenyl LAB, such as those supplied by Sasol under the tradename Hyblene®.

Suitable sulphate detersive surfactants include alkyl sulphate, preferably $C_{8-18}$ alkyl sulphate, or predominantly $C_{12}$ alkyl sulphate.

A preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 5, more preferably from 0.5 to 3 and most preferably from 0.5 to 1.5.

The alkyl sulphate, alkyl alkoxylated sulphate and alkyl benzene sulphonates may be linear or branched, substituted or un-substituted, and may be derived from petrochemical material or biomaterial.

Other suitable anionic detersive surfactants include alkyl ether carboxylates.

Suitable anionic detersive surfactants may be in salt form, suitable counter-ions include sodium, calcium, magnesium, amino alcohols, and any combination thereof. A preferred counter-ion is sodium.

Non-ionic detersive surfactant: Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; alkylpolysaccharides, preferably alkylpolyglycosides; methyl ester ethoxylates; polyhydroxy fatty acid amides; ether capped poly(oxyalkylated) alcohol surfactants; and mixtures thereof.

Suitable non-ionic detersive surfactants are alkylpolyglucoside and/or an alkyl alkoxylated alcohol.

Suitable non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable nonionic detersive surfactants include secondary alcohol-based detersive surfactants.

Cationic detersive surfactant: Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate.

Zwitterionic detersive surfactant: Suitable zwitterionic detersive surfactants include amine oxides and/or betaines.

Polymer: Suitable polymers include carboxylate polymers, soil release polymers, anti-redeposition polymers, cellulosic polymers, care polymers and any combination thereof.

Carboxylate polymer: The composition may comprise a carboxylate polymer, such as a maleate/acrylate random copolymer or polyacrylate homopolymer. Suitable carboxylate polymers include: polyacrylate homopolymers having a molecular weight of from 4,000 Da to 9,000 Da; maleate/acrylate random copolymers having a molecular weight of from 50,000 Da to 100,000 Da, or from 60,000 Da to 80,000 Da.

Another suitable carboxylate polymer is a co-polymer that comprises: (i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II): formula (I):

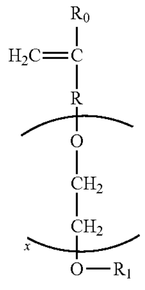

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group; formula (II)

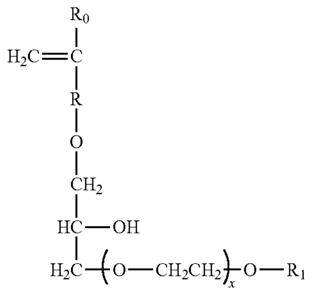

wherein in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

It may be preferred that the polymer has a weight average molecular weight of at least 50 kDa, or even at least 70 kDa.

Soil release polymer: The composition may comprise a soil release polymer. A suitable soil release polymer has a structure as defined by one of the following structures (I), (II) or (III):

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

$$—[(OCHR^5—CHR^6)_c—OR]_f \quad (III)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are sold by Clariant under the TexCare® series of polymers, e.g. TexCare® SRN240 and TexCare® SRA300. Other suitable soil release polymers are sold by Solvay under the Repel-o-Tex® series of polymers, e.g. Repel-o-Tex® SF2 and Repel-o-Tex® Crystal.

Anti-redeposition polymer: Suitable anti-redeposition polymers include polyethylene glycol polymers and/or polyethyleneimine polymers.

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide unit can be less than 0.02, or less than 0.016, the average number of graft sites per ethylene oxide unit can be in the range of from 0.010 to 0.018, or the average number of graft sites per ethylene oxide unit can be less than 0.010, or in the range of from 0.004 to 0.008.

Suitable polyethylene glycol polymers are described in WO08/007320.

A suitable polyethylene glycol polymer is Sokalan HP22.

Cellulosic polymer: Suitable cellulosic polymers are selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixtures thereof.

Suitable carboxymethyl celluloses have a degree of carboxymethyl substitution from 0.5 to 0.9 and a molecular weight from 100,000 Da to 300,000 Da.

Suitable carboxymethyl celluloses have a degree of substitution greater than 0.65 and a degree of blockiness greater than 0.45, e.g. as described in WO09/154933.

Care polymers: Suitable care polymers include cellulosic polymers that are cationically modified or hydrophobically modified. Such modified cellulosic polymers can provide anti-abrasion benefits and dye lock benefits to fabric during the laundering cycle. Suitable cellulosic polymers include cationically modified hydroxyethyl cellulose.

Other suitable care polymers include dye lock polymers, for example the condensation oligomer produced by the condensation of imidazole and epichlorhydrin, preferably in ratio of 1:4:1. A suitable commercially available dye lock polymer is Polyquart® FDI (Cognis).

Other suitable care polymers include amino-silicone, which can provide fabric feel benefits and fabric shape retention benefits.

Bleach catalyst: The composition may comprise a bleach catalyst. Suitable bleach catalysts include oxaziridinium bleach catalysts, transition metal bleach catalysts, especially manganese and iron bleach catalysts. A suitable bleach catalyst has a structure corresponding to general formula below:

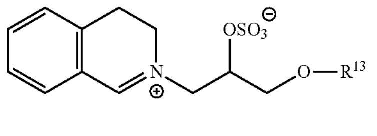

wherein $R^{13}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl.

Pre-formed peracid: Suitable pre-form peracids include phthalimido-peroxycaproic acid.

Enzymes: Suitable enzymes include lipases, proteases, cellulases, amylases and any combination thereof.

Protease: Suitable proteases include metalloproteases and/or serine proteases. Examples of suitable neutral or alkaline proteases include: subtilisins (EC 3.4.21.62); trypsin-type or chymotrypsin-type proteases; and metalloproteases. The suitable proteases include chemically or genetically modified mutants of the aforementioned suitable proteases.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Preferenz P® series of proteases including Preferenz® P280, Preferenz® P281, Preferenz® P2018-C, Preferenz® P2081-WE, Preferenz® P2082-EE and Preferenz® P2083-A/J, Properase®, Purafect®, Purafect Prime®, Purafect Ox®, FN3®, FN4®, Excellase® and Purafect OXP® by DuPont, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

A suitable protease is described in WO11/140316 and WO11/072117.

Amylase: Suitable amylases are derived from AA560 alpha amylase endogenous to *Bacillus* sp. DSM 12649, preferably having the following mutations: R118K, D183*, G184*, N195F, R320K, and/or R458K. Suitable commercially available amylases include Stainzyme®, Stainzyme® Plus, Natalase, Termamyl®, Termamyl® Ultra, Liquezyme® SZ, Duramyl®, Everest® (all Novozymes) and Spezyme® AA, Preferenz S® series of amylases, Purastar® and Purastar® Ox Am, Optisize® HT Plus (all Du Pont).

A suitable amylase is described in WO06/002643.

Cellulase: Suitable cellulases include those of bacterial or fungal origin. Chemically modified or protein engineered mutants are also suitable. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

Commercially available cellulases include Celluzyme®, Carezyme®, and Carezyme® Premium, Celluclean® and Whitezyme® (Novozymes A/S), Revitalenz® series of enzymes (Du Pont), and Biotouch® series of enzymes (AB Enzymes). Suitable commercially available cellulases include Carezyme® Premium, Celluclean® Classic. Suitable cellulases are described in WO07/144857 and WO10/056652.

Lipase: Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (T *lanuginosus*).

The lipase may be a "first cycle lipase", e.g. such as those described in WO06/090335 and WO13/116261. In one aspect, the lipase is a first-wash lipase, preferably a variant of the wild-type lipase from *Thermomyces lanuginosus* comprising T231R and/or N233R mutations. Preferred lipases include those sold under the tradenames Lipex®, Lipolex® and Lipoclean® by Novozymes, Bagsvaerd, Denmark.

Other suitable lipases include: Liprl 139, e.g. as described in WO2013/171241; and TfuLip2, e.g. as described in WO2011/084412 and WO2013/033318.

Other enzymes: Other suitable enzymes are bleaching enzymes, such as peroxidases/oxidases, which include those of plant, bacterial or fungal origin and variants thereof Commercially available peroxidases include Guardzyme® (Novozymes A/S). Other suitable enzymes include choline oxidases and perhydrolases such as those used in Gentle Power Bleach™.

Other suitable enzymes include pectate lyases sold under the tradenames X-Pect®, Pectaway® (from Novozymes A/S, Bagsvaerd, Denmark) and PrimaGreen® (DuPont) and mannanases sold under the tradenames Mannaway® (Novozymes A/S, Bagsvaerd, Denmark), and Mannastar® (Du Pont).

Zeolite builder: The composition may comprise zeolite builder. The composition may comprise from 0 wt % to 5 wt % zeolite builder, or to 3 wt % zeolite builder. The composition may even be substantially free of zeolite builder; substantially free means "no deliberately added". Typical zeolite builders include zeolite A, zeolite P and zeolite MAP.

Phosphate builder: The composition may comprise phosphate builder. The composition may comprise from 0 wt % to 5 wt % phosphate builder, or to 3 wt %, phosphate builder. The composition may even be substantially free of phosphate builder; substantially free means "no deliberately added". A typical phosphate builder is sodium tri-polyphosphate.

Carbonate salt: The composition may comprise carbonate salt. The composition may comprise from 0 wt % to 10 wt % carbonate salt, or to 5 wt % carbonate salt. The composition may even be substantially free of carbonate salt; substantially free means "no deliberately added". Suitable carbonate salts include sodium carbonate and sodium bicarbonate.

Silicate salt: The composition may comprise silicate salt. The composition may comprise from 0 wt % to 10 wt % silicate salt, or to 5 wt % silicate salt. A preferred silicate salt is sodium silicate, especially preferred are sodium silicates having a $Na_2O:SiO_2$ ratio of from 1.0 to 2.8, preferably from 1.6 to 2.0.

Sulphate salt: A suitable sulphate salt is sodium sulphate.

Brightener: Suitable fluorescent brighteners include: distyryl biphenyl compounds, e.g. Tinopal® CBS-X, di-amino stilbene di-sulfonic acid compounds, e.g. Tinopal® DMS pure Xtra and Blankophor® HRH, and Pyrazoline compounds, e.g. Blankophor® SN, and coumarin compounds, e.g. Tinopal® SWN.

Preferred brighteners are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)]; amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis(2-sulfostyryl)biphenyl. A suitable fluorescent brightener is C.I. Fluorescent Brightener 260, which may be used in its beta or alpha crystalline forms, or a mixture of these forms.

Chelant: The composition may also comprise a chelant selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid) and hydroxyethane di(methylene phosphonic acid). A preferred chelant is ethylene diamine-N'N'-disuccinic acid (EDDS) and/or hydroxyethane diphosphonic acid (HEDP). The composition preferably comprises ethylene diamine-N'N'-disuccinic acid or salt thereof. Preferably the ethylene diamine-N'N'-disuccinic acid is in S,S enantiomeric form. Preferably the composition comprises 4,5-dihydroxy-m-benzenedisulfonic acid disodium salt. Preferred chelants may also function as calcium carbonate crystal growth inhibitors such as: 1-hydroxyethanediphosphonic acid (HEDP) and salt thereof; N,N-dicarboxymethyl-2-aminopentane-1,5-dioic acid and salt thereof, 2-phosphonobutane-1,2,4-tricarboxylic acid and salt thereof, and combination thereof.

Hueing agent: Suitable hueing agents include small molecule dyes, typically falling into the Colour Index (C.I.) classifications of Acid, Direct, Basic, Reactive (including hydrolysed forms thereof) or Solvent or Disperse dyes, for example classified as Blue, Violet, Red, Green or Black, and provide the desired shade either alone or in combination. Preferred such hueing agents include Acid Violet 50, Direct Violet 9, 66 and 99, Solvent Violet 13 and any combination thereof.

Many hueing agents are known and described in the art which may be suitable for the present invention, such as hueing agents described in WO2014/089386.

Suitable hueing agents include phthalocyanine and azo dye conjugates, such as described in WO2009/069077.

Suitable hueing agents may be alkoxylated. Such alkoxylated compounds may be produced by organic synthesis that may produce a mixture of molecules having different degrees of alkoxylation. Such mixtures may be used directly to provide the hueing agent, or may undergo a purification step to increase the proportion of the target molecule. Suitable hueing agents include alkoxylated bis-azo dyes, such as described in WO2012/054835, and/or alkoxylated thiophene azo dyes, such as described in WO2008/087497 and WO2012/166768.

The hueing agent may be incorporated into the detergent composition as part of a reaction mixture which is the result of the organic synthesis for a dye molecule, with optional purification step(s). Such reaction mixtures generally comprise the dye molecule itself and in addition may comprise un-reacted starting materials and/or by-products of the organic synthesis route. Suitable hueing agents can be incorporated into hueing dye particles, such as described in WO 2009/069077.

Dye transfer inhibitors: Suitable dye transfer inhibitors include polyamine N-oxide polymers, copolymers of N-vinylpyrrolidone and N-vinylimidazole, polyvinylpyrrolidone, polyvinyloxazolidone, polyvinylimidazole and mixtures thereof. Preferred are poly(vinyl pyrrolidone), poly (vinylpyridine betaine), poly(vinylpyridine N-oxide), poly (vinyl pyrrolidone-vinyl imidazole) and mixtures thereof. Suitable commercially available dye transfer inhibitors include PVP-K15 and K30 (Ashland), Sokalan® HP165, HP50, HP53, HP59, HP56K, HP56, HP66 (BASF), Chromabond® S-400, S403E and S-100 (Ashland).

Perfume: Suitable perfumes comprise perfume materials selected from the group: (a) perfume materials having a C log P of less than 3.0 and a boiling point of less than 250° C. (quadrant 1 perfume materials); (b) perfume materials having a C log P of less than 3.0 and a boiling point of 250° C. or greater (quadrant 2 perfume materials); (c) perfume materials having a C log P of 3.0 or greater and a boiling point of less than 250° C. (quadrant 3 perfume materials); (d) perfume materials having a C log P of 3.0 or greater and a boiling point of 250° C. or greater (quadrant 4 perfume materials); and (e) mixtures thereof.

It may be preferred for the perfume to be in the form of a perfume delivery technology. Such delivery technologies further stabilize and enhance the deposition and release of perfume materials from the laundered fabric. Such perfume delivery technologies can also be used to further increase the longevity of perfume release from the laundered fabric. Suitable perfume delivery technologies include: perfume microcapsules, polymer assisted deliveries, molecule assisted deliveries, fiber assisted deliveries, amine assisted deliveries, starch encapsulated accord, zeolite and other inorganic carriers, and any mixture thereof. A suitable perfume microcapsule is described in WO2009/101593.

Silicone: Suitable silicones include polydimethylsiloxane and amino-silicones. Suitable silicones are described in WO05075616.

Preferably the composition of the invention is in solid form, more preferably in powder form.

Process for making the solid composition: Typically, the composition can be prepared by any suitable method. For example: spray-drying, agglomeration, extrusion and any combination thereof.

Typically, a suitable spray-drying process comprises the step of forming an aqueous slurry mixture, transferring it through at least one pump, preferably two pumps, to a pressure nozzle. Atomizing the aqueous slurry mixture into a spray-drying tower and drying the aqueous slurry mixture to form spray-dried particles. Preferably, the spray-drying tower is a counter-current spray-drying tower, although a co-current spray-drying tower may also be suitable.

Typically, the spray-dried powder is subjected to cooling, for example an air lift. Typically, the spray-drying powder is subjected to particle size classification, for example a sieve, to obtain the desired particle size distribution. Preferably, the spray-dried powder has a particle size distribution such that weight average particle size is in the range of from 300 micrometers to 500 micrometers, and less than 10 wt % of the spray-dried particles have a particle size greater than 2360 micrometers.

It may be preferred to heat the aqueous slurry mixture to elevated temperatures prior to atomization into the spray-drying tower, such as described in WO2009/158162.

It may be preferred for anionic surfactant, such as linear alkyl benzene sulphonate, to be introduced into the spray-drying process after the step of forming the aqueous slurry mixture: for example, introducing an acid precursor to the aqueous slurry mixture after the pump, such as described in WO 09/158449.

It may be preferred for a gas, such as air, to be introduced into the spray-drying process after the step of forming the aqueous slurry, such as described in WO2013/181205.

It may be preferred for any inorganic ingredients, such as sodium sulphate and sodium carbonate, if present in the aqueous slurry mixture, to be micronized to a small particle size such as described in WO2012/134969.

Typically, a suitable agglomeration process comprises the step of contacting a detersive ingredient, such as a detersive surfactant, e.g. linear alkyl benzene sulphonate (LAS) and/or alkyl alkoxylated sulphate, with an inorganic material, such as sodium carbonate and/or silica, in a mixer. The agglomeration process may also be an in-situ neutralization agglomeration process wherein an acid precursor of a detersive surfactant, such as LAS, is contacted with an alkaline material, such as carbonate and/or sodium hydroxide, in a mixer, and wherein the acid precursor of a detersive surfactant is neutralized by the alkaline material to form a detersive surfactant during the agglomeration process.

Other suitable detergent ingredients that may be agglomerated include polymers, chelants, bleach activators, silicones and any combination thereof.

The agglomeration process may be a high, medium or low shear agglomeration process, wherein a high shear, medium shear or low shear mixer is used accordingly. The agglomeration process may be a multi-step agglomeration process wherein two or more mixers are used, such as a high shear mixer in combination with a medium or low shear mixer. The agglomeration process can be a continuous process or a batch process.

It may be preferred for the agglomerates to be subjected to a drying step, for example to a fluid bed drying step. It may also be preferred for the agglomerates to be subjected to a cooling step, for example a fluid bed cooling step.

Typically, the agglomerates are subjected to particle size classification, for example a fluid bed elutriation and/or a sieve, to obtain the desired particle size distribution. Preferably, the agglomerates have a particle size distribution such that weight average particle size is in the range of from 300 micrometers to 800 micrometers, and less than 10 wt % of the agglomerates have a particle size less than 150 micrometers and less than 10 wt % of the agglomerates have a particle size greater than 1200 micrometers.

It may be preferred for fines and over-sized agglomerates to be recycled back into the agglomeration process. Typically, over-sized particles are subjected to a size reduction step, such as grinding, and recycled back into an appropriate place in the agglomeration process, such as the mixer. Typically, fines are recycled back into an appropriate place in the agglomeration process, such as the mixer.

It may be preferred for ingredients such as polymer and/or non-ionic detersive surfactant and/or perfume to be sprayed onto base detergent particles, such as spray-dried base detergent particles and/or agglomerated base detergent particles. Typically, this spray-on step is carried out in a tumbling drum mixer.

Method of Treating a Surface

The present disclosure relates to a method of treating a surface, the surface can be a hard surface or a soft surface, preferably the surface is a soft surface, more preferably the surface is a fabric. The surface is treated the composition of the invention.

For example, the method of the present disclosure may include contacting a fabric with a composition according to the present disclosure. The contacting may occur in the presence of water, in its totality or partially. The product, or part thereof, may be diluted and/or dissolved in the water to form a treatment liquor.

The method of the present disclosure may include contacting a surface, preferably a fabric with an aqueous treatment liquor. The aqueous treatment liquor may comprise from about $1\times10^2$ Colony forming units (CFU)/liter to about $1\times10^8$ CFU/liter, preferably from about $1\times10^4$ CFU to about $1\times10^7$ CFU/liter of liquor of bacterial spores, preferably *Bacillus* spores.

The method of the invention preferably involves the laundering of a fabric.

Method of laundering fabric: The method of laundering fabric comprises the step of contacting the solid composition to water to form a wash liquor, and laundering fabric in said wash liquor. The fabric may be contacted to the water prior to, or after, or simultaneous with, contacting the solid composition with water. Typically, the wash liquor is formed by contacting the laundry detergent to water in such an amount so that the concentration of laundry detergent composition in the wash liquor is from 0.2 g/l to 20 g/l, or from 0.5 g/l to 10 g/l, or to 5.0 g/l. The method of laundering fabric can be carried out in a front-loading automatic washing machine, top loading automatic washing machines, including high efficiency automatic washing machines, or suitable hand-wash vessels. Typically, the wash liquor comprises 90 litres or less, or 60 litres or less, or 15 litres or less, or 10 litres or less of water. Typically, 200 g or less, or 150 g or less, or 100 g or less, or 50 g or less of laundry detergent composition is contacted to water to form the wash liquor.

EXAMPLES

The purpose of the testing was to compare different products for stain removal performance and compatibility with *Bacillus* spores. Products 1*, 2*, 4* and 5* are comparative products. Product 3 is a composition according to the invention.

Stain Removal Test

Stain swatches cut to 5 cm×5 cm (Tea C-S-47, Wine E-114, Blackberry C-S-21, Cherry C-S-14, Center for Testmaterials BV, Vlaardingen, Netherlands) were washed with five different products (Products 1*, 2*, 3, 4* and 5*). Wash concentrations of the base detergent and additional materials are shown in parts per million (ppm) w/v, e.g. 1000 ppm would involve dissolution of 1 g in 1 L of water. The base detergent is bleach-free Ariel powder as supplied by Procter & Gamble UK. The sodium percarbonate was supplied by Solvay (Brussels, Belgium) and is 13.46% available oxygen, i.e. contains 28.60% hydrogen peroxide. The N,N,N',N'-tetraacetylethylenediamine (TAED) was supplied by Warwick Chemicals (Mostyn, United Kingdom). It was formulated as a 92.3% active granule and the level shown in the table is on an 'as is' basis, with a theoretical peracetic acid yield calculated on the basis of its acid form, this active content and complete perhydrolysis. The hydrogen peroxide solution was supplied by Supelco (30% 1.072209.1000) and expressed on an active basis. The peracetic acid was supplied by Merck (107222) and expressed on an active basis.

| | Concentration (ppm) | | | | |
|---|---|---|---|---|---|
| Product | 1* | 2* | 3 | 4* | 5* |
| Base detergent | 9360 | 9360 | 9360 | 9360 | 9360 |
| Sodium percarbonate | — | 800 | 2100 | — | — |
| Theoretical H2O2 | — | 228.8 | 600.6 | — | — |
| TAED | — | 90 | 380 | — | — |
| Theoretical Peracetic acid | — | 55.4 | 233.7 | — | — |
| Hydrogen peroxide | — | — | — | 1000 | 1000 |
| Peracetic acid | — | — | — | 50 | 50 |
| Citric acid | — | — | — | — | 5200 |
| pH | 11.23 | 10.84 | 10.66 | 8.77 | 3.50 |

The treatment involved washing the swatches in a 1 L tergotometer containing city water (Northumbrian Water, 9 gpg (US) water hardness) along with 8 g of WfK SBL2004 cut into 5 cm×5 cm squares (Order code 10996 WfK Testgewebe GmbH, Bruggen, Germany), and 5 cm×5 cm knitted cotton ballast (GMT desized knitted cotton, Warwick Equest Ltd, Consett, UK) to make the total load weight to 60 g. The fabrics were washed for 30 minutes at 35° C., 208 rpm, and rinsed twice for 5 minutes at 15° C. Each treatment involved 8 replicates of each stain type; these were washed as 4 external and 2 internal replicates, i.e. two of each stain were washed in four separate tergotometer pots.

Stains were left to dry and evaluated for stain removal using L*a*b* readings taken using a DigiEye (VeriVide Ltd, Leicester, UK) at shutter speed ½, Aperture 8 which was calibrated before use. L*a*b* measurements were taken for unwashed stains, washed stains and unsoiled fabric, and Delta E* calculations made to determine the level of staining for both unwashed stains and washed stains compared to the unsoiled fabric using the following equation where the suffix 1 denotes the values for the unsoiled fabric and the suffix 2 denotes the values for the unwashed or washed stains.

$$\Delta E_{ab}{}^* = \sqrt{(L_2{}^* - L_1{}^*)^2 + (a_2{}^* - a_1{}^*)^2 + (b_2{}^* - b_1{}^*)^2}$$

The Stain Removal Index (SRI) is the level of stain removal calculated as a percentage as follows:

$$SRI = 100 \times (A - B)/A$$

Where:

A=Delta E* of Unwashed fabric stained region

B=Delta E* of Washed fabric stained region

The table below shows the stain removal results, of which products 3, 4* and 5* show significantly higher stain removal benefits on all stains tested compared to treatments 1* and 2*.

| | Wine | | Tea | | Cherry | | Blackberry | | Average |
|---|---|---|---|---|---|---|---|---|---|
| Product | SRI | StDev | SRI | StDev | SRI | StDev | SRI | StDev | SRI |
| 1 | 36.91 | 4.25 | −1.34 | 6.85 | 41.49 | 1.92 | 5.18 | 12.58 | 20.6 |
| 2 | 71.04 | 1.85 | 35.54 | 3.16 | 50.64 | 1.50 | 41.19 | 6.59 | 49.6 |
| 3 | 83.25 | 1.79 | 52.90 | 2.67 | 56.88 | 1.20 | 57.33 | 6.22 | 62.6 |
| 4 | 90.54 | 1.05 | 84.76 | 1.15 | 73.04 | 0.75 | 73.37 | 21.94 | 80.4 |
| 5 | 81.12 | 0.67 | 58.56 | 1.54 | 46.61 | 0.95 | 49.33 | 9.09 | 58.9 |

*Bacillus* Spore Viability Test

Products were evaluated for spore survival during the wash by dissolving the products at the same concentrations used for the stain removal test with $3\times10^8$ cfu/ml of *Bacillus* spores (Evozyme® P500 BS7 powder, Genesis Biosciences, Cardiff, UK) in 1 L of sterile deionized water, stirred with a magnetic stirrer to create a vortex. Samples were taken at 0, 20, 40, 60, 90, and 120 minute time intervals and diluted 1:10 in neutralizing solution (20 g/L sodium thiosulphate (product code 31543.293, VWR) and 500 U/ml catalase (product code 60634, Sigma Aldrich) and incubated at room temperature for a minimum of 10 minutes. Neutralized aliquots were serially diluted 1:10 into sterile physiological saline (product code BM0380-9ML 0.85%, Trafalgar), plated onto Tryptic Soy Agar (product code 8084, Trafalgar) and incubated at 35° C. for 24 hours before counting colonies. The composition of Products 1*, 2*, 3, 4* and 5* were the same as the stain removal testing above.

The table below shows the spore count over time, of which products 4* and 5* show complete spore kill after 20 minutes. Products 1*, 2* and 3 show no loss in spore viability over the time tested.

| | Spore count over time (Log cfu/ml) | | | | | |
|---|---|---|---|---|---|---|
| Product | 0 | 20 | 40 | 60 | 90 | 120 |
| 1 | 8.06 | 8.13 | 8.16 | 8.15 | 8.08 | 8.14 |
| 2 | 8.15 | 8.12 | 8.11 | 8.16 | 8.05 | 8.19 |
| 3 | 8.12 | 8.04 | 8.04 | 8.16 | 8.15 | 8.15 |
| 4 | 8.11 | 0 | 0 | 0 | 0 | 0 |
| 5 | 8.09 | 0 | 0 | 0 | 0 | 0 |

The combined results show that Product 3 in accordance with the invention achieves both excellent stain removal and excellent spore viability. This is surprising as bleaching agents such as hydrogen peroxide and the peracetic acid generated through its reaction with TAED are reported to be sporicidal.

Examples 2-7

The following are granular laundry detergent compositions designed for hand washing or top-loading washing machines.

| | 2 (wt %) | 3 (wt %) | 4 (wt %) | 5 (wt %) | 6 (wt %) | 7 (wt %) |
|---|---|---|---|---|---|---|
| Linear alkylbenzenesulfonate | 20 | 22 | 20 | 15 | 20 | 20 |
| C12-14 Dimethylhydroxyethyl ammonium chloride | 0.7 | 0.2 | 1 | 0.6 | 0.0 | 0.0 |
| AE3S | 0.9 | 1 | 0.9 | 0.0 | 0.5 | 0.9 |
| AE7 | 0.0 | 0.0 | 0.0 | 1 | 0.0 | 3 |
| Zeolite A | 0.0 | 1 | 0.0 | 1 | 4 | 1 |
| 1.6R Silicate (SiO2:Na2O at ratio 1.6:1) | 7 | 5 | 2 | 3 | 3 | 5 |
| Sodium carbonate | 25 | 20 | 25 | 17 | 18 | 19 |
| Polyacrylate MW 4500 | 1 | 0.6 | 1 | 1 | 1.5 | 1 |
| Random graft copolymer | 0.1 | 0.2 | 0.0 | 0.0 | 0.0 | 0.0 |
| Carboxymethyl cellulose | 1 | 0.3 | 1 | 1 | 1 | 1 |
| Protease (Savinase ®, 32.89 mg active/g) | 0.1 | 0.1 | 0.1 | 0.1 | | 0.1 |
| DNase (Eclipse ® 150T, 15.0 mg active/g) | 0.2 | 0.0 | 0.1 | 0.3 | 0.0 | 0.2 |
| Lipase-Lipex ® Evity 105T (37 mg active/g) | 0.03 | 0.07 | 0.3 | 0.1 | 0.07 | 0.4 |
| Amylase Stainzyme ® Plus (20 mg active/g) | 0.2 | 0.4 | 0.2 | 0.6 | 0.2 | 0.2 |
| Fluorescent Brightener 1 | 0.06 | 0.0 | 0.06 | 0.18 | 0.06 | 0.06 |
| Fluorescent Brightener 2 | 0.1 | 0.06 | 0.1 | 0.0 | 0.1 | 0.1 |
| Na salt of Ethylenediamine-N,N'-disuccinic acid, (S,S) isomer (EDDS) | 0.6 | 0.8 | 0.6 | 0.25 | 0.6 | 0.6 |
| MgSO4 | 1 | 1 | 1 | 0.5 | 1 | 1 |
| Sodium Percarbonate | 12.2 | 9.1 | 13.2 | 12.0 | 11.7 | 7.2 |
| NOBS (80% active) | 1.9 | 0.0 | 1.66 | 0.0 | 0.0 | 0.75 |
| TAED (92.3% active) | 3.7 | 2.3 | 3.6 | 3.2 | 3.1 | 2.3 |
| Sulphonated zinc phthalocyanine | 0.0030 | 0.0 | 0.0012 | 0.0030 | 0.0021 | 0.0 |
| Direct Violet 9 | 0.0 | 0.0 | 0.0003 | 0.0005 | 0.0003 | 0.0 |
| Acid Blue 29 | 0.0 | 0.0 | 0.0 | 0.0 | 0.0 | 0.0003 |
| *Bacillus* spore powder (Evozyme ® P500 BS7) | 0.3 | 0.1 | 0.03 | 0.02 | 0.43 | 0.2 |
| Sulfate/Moisture | | | | Balance | | |

Examples 8-14

The following are granular laundry detergent compositions designed for front-loading automatic washing machines.

| | 8 (wt %) | 9 (wt %) | 10 (wt %) | 11 (wt %) | 12 (wt %) | 13 (wt %) | 14 (wt %) |
|---|---|---|---|---|---|---|---|
| Linear alkylbenzenesulfonate | 8 | 7.1 | 7 | 6.5 | 7.5 | 7.5 | 11 |
| AE3S | 0 | 4.8 | 0 | 5.2 | 4 | 4 | 0 |
| C12-14 Alkylsulfate | 1 | 0 | 1 | 0 | 0 | 0 | 1 |
| AE7 | 2.2 | 0 | 3.2 | 0 | 0 | 0 | 1 |
| C10-12 Dimethyl hydroxyethyl-ammonium chloride | 0.75 | 0.94 | 0.98 | 0.98 | 0 | 0 | 0 |
| Crystalline layered silicate (δ-Na2Si2O5) | 4.1 | 0 | 4.8 | 0 | 0 | 0 | 7 |

-continued

| | 8 (wt %) | 9 (wt %) | 10 (wt %) | 11 (wt %) | 12 (wt %) | 13 (wt %) | 14 (wt %) |
|---|---|---|---|---|---|---|---|
| Zeolite A | 5 | 0 | 5 | 0 | 2 | 2 | 4 |
| Citric Acid | 3 | 5 | 3 | 4 | 2.5 | 3 | 0.5 |
| Sodium Carbonate | 15 | 20 | 14 | 20 | 23 | 23 | 14 |
| Silicate 2R (SiO2:Na2O at ratio 2:1) | 0.08 | 0 | 0.11 | 0 | 0 | 0 | 0.01 |
| Soil release agent | 0.75 | 0.72 | 0.71 | 0.72 | 0 | 0 | 0.1 |
| Acrylic Acid/Maleic Acid Copolymer | 1.1 | 3.7 | 1.0 | 3.7 | 2.6 | 3.8 | 2 |
| Carboxymethylcellulose | 0.15 | 1.4 | 0.2 | 1.4 | 1 | 0.5 | 0.2 |
| Protease (Savinase ®, 32.89 mg active/g) | 0.2 | 0.2 | 0.3 | 0.15 | 0.12 | 0.13 | 0.18 |
| DNase (Eclipse ® 150T, 15.0 mg active/g) | 0.05 | 0.15 | 0.1 | 0 | 0 | 0 | 0.1 |
| Lipase - Lipex ® Evity 105T (37 mg active/g) | 0 | 0 | 0 | 0 | 0.1 | 0.1 | 0 |
| Amylase Stainzyme ® Plus (20 mg active/g) | 0.3 | 0.2 | 0.2 | 0.4 | 0.2 | 0.2 | 0.1 |
| Mannanase - Mannaway ® (4 mg active/g) | 0.05 | 0.1 | 0 | 0.05 | 0.1 | 0 | 0.1 |
| Percarbonate | 13 | 13.2 | 13 | 13.2 | 16 | 14 | 14 |
| TAED (92.3% active) | 3.6 | 4.0 | 3.6 | 4.0 | 2.2 | 2.9 | 3.8 |
| Na salt of Ethylenediamine-N,N'-disuccinic acid, (S,S) isomer (EDDS) | 0.2 | 0.2 | 0.001 | 0.2 | 0.2 | 0.2 | 0.001 |
| Hydroxyethane di phosphonate (HEDP) | 0.2 | 0.2 | 0.5 | 0.2 | 0.2 | 0.2 | 0.5 |
| MgSO4 | 0.42 | 0.42 | 0.42 | 0.42 | 0.4 | 0.4 | 0 |
| Perfume | 0.5 | 0.6 | 0.5 | 0.6 | 0.6 | 0.6 | 0.8 |
| Suds suppressor agglomerate | 0.05 | 0.1 | 0.05 | 0.1 | 0.06 | 0.05 | 0.05 |
| Soap | 0.45 | 0.45 | 0.45 | 0.45 | 0 | 0 | 0 |
| Sulphonated zinc phthalocyanine (active) | 0.0007 | 0.0012 | 0.0007 | 0 | 0 | 0 | 0 |
| Direct Violet 9 (active) | 0 | 0 | 0.0001 | 0.0001 | 0 | 0 | 0.001 |
| Bacillus spore powder (Evozyme ® P500 BS7) | 0.01 | 0.03 | 0.05 | 0.4 | 0.3 | 0.2 | 0.1 |
| Sulfate/Water & Miscellaneous | | | | Balance | | | |

Notes: All enzymes are supplied by Novozymes. AE3S is $C_{12-15}$ alkyl ethoxy (3) sulfate. AE7 is $C_{12-13}$ alcohol ethoxylate, with an average degree of ethoxylation of 7.

Soil release agent is Texcarer ® SRA300, supplied by Clariant. Random graft copolymer is a polyethylene glycol grafted with vinyl acetate side chains, provided by BASF.

Sodium percarbonate is 13.46% available oxygen and supplied by Solvay.

NOBS is sodium nonanoyloxybenzene sulfonate, supplied by FutureFuel TAED is N,N,N',N'-tetraacetylethylenediamine, supplied by Warwick. Fluorescent brightener 1 is disodium 4,4'-bis{[4-anilino-6-morpholino-s-triazin-2-yl]-amino}-2,2'-stilbenedisulfonate. Fluorescent brightener 2 is disodium 4,4'-bis-(2-sulfostyryl)biphenyl (sodium salt)

Bacillus spore powder (Evozyme ® P500 BS7) was supplied by Genesis Biosciences and has an active content of 5.0E+10 CFU/g.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A solid cleaning composition comprising:

i) from about 5% to about 25% by weight of the composition of a hydrogen peroxide source, wherein the hydrogen peroxide source comprises sodium percarbonate;

ii) from 1% to about 10% by weight of the composition of a bleach activator, wherein the bleach activator comprises tetraacetylethylenediamine (TAED);

from about $1\times10^{2}$ to about $1\times10^{11}$ CFU/g of bacterial spores, wherein the bacterial spores comprise bacteria from the genus *Bacillus*; and wherein the solid composition has a pH of from 10 to 11 as measured in 1% weight/volume aqueous solution in distilled water at 20° C.

2. The composition according to claim 1 wherein the hydrogen peroxide source and the bleach activator are in a weight ratio of from about 2:1 to about 20:1.

3. The composition according to any of claim 1 wherein the composition has a reserve alkalinity to pH of 7.5 between about 5 to about 20 (expressed as g NaOH/100 g composition), determined by titrating a 1% (w/v) solution of composition with 0.2 M hydrochloric acid in distilled water at 20° C.

4. The composition according to claim 1 wherein the bacterial spores comprise bacteria selected from the group consisting of *Bacillus subtilis, Bacillus amyloliquefaciens,*

*Bacillus licheniformis, Bacillus megaterium, Bacillus pumilus, Bacillus cereus, Bacillus thuringiensis, Bacillus mycoides, Bacillus tequilensis, Bacillus vallismortis, Bacillus mojavensis*, and mixtures thereof.

5. The composition according to claim 1 wherein the bacterial spores comprise bacteria selected from the group consisting of *Bacillus subtilis, Bacillus amyloliquefaciens, Bacillus licheniformis, Bacillus megaterium, Bacillus pumilus*, and mixtures thereof.

6. The composition according to claim 1 further comprising a detersive surfactant.

7. The composition according to claim 1 further comprising from about 1 to about 20% by weight of the composition of a builder.

8. The composition according to claim 1 comprising:

i) from about 10% to about 20% by weight of the composition of the hydrogen peroxide source;

ii) from 2.0% to about 5% by weight of the composition of the bleach activator;

iii) from about $1\times10^4$ to about $1\times10^7$ CFU/g of the bacterial spores;

iv) further comprising from about 1% to about 20% by weight of the composition of detersive surfactant; and v) further comprising from about 1% to about 20% by weight of the composition of a builder.

9. The composition according to claim 1 wherein the composition is a laundry composition.

10. The composition according to claim 1 wherein the composition is a laundry powder composition.

11. The composition according to claim 1, wherein the solid composition is free of added hydrogen peroxide.

* * * * *